US006084357A

United States Patent [19]

[11] Patent Number: 6,084,357

Janning

[45] Date of Patent: Jul. 4, 2000

[54] SERIES CONNECTED LIGHT STRING WITH FILAMENT SHUNTING

[76] Inventor: John L. Janning, 332 Vindale Dr., Dayton, Ohio 45440

[21] Appl. No.: 09/058,451

[22] Filed: Apr. 10, 1998

[51] Int. Cl.[7] .................... H02H 9/00

[52] U.S. Cl. .................... 315/122; 315/185 R; 315/185 S; 361/54

[58] Field of Search .................... 315/185 S, 129, 315/132, 130, 323, 122, 92; 361/58, 54

[56] References Cited

U.S. PATENT DOCUMENTS 4,727,449 2/1988 Fleck .................... 361/54

*Primary Examiner*—David Vu

*Attorney, Agent, or Firm*—J. T. Cavender; Boris Haskell

[57] ABSTRACT

A string set of series-connected incandescent bulbs adapted to being connected to a source of alternating-current operating potential and in which all of the bulb filaments in the set are individually provided with a non-avalanche shunt circuit which substantially maintains the rated voltage of the bulb across each of the bulb sockets whether or not an operative bulb occupies its respective socket and whereby the illumination of each remaining operative bulb continues to be substantially unchanged and substantially the same rated current continues to flow through said string set despite the absence of a plurality of bulbs from their respective sockets.

8 Claims, 2 Drawing Sheets

SERIES CONNECTED LIGHT STRING WITH FILAMENT SHUNTING

TECHNICAL FIELD

One of the most common uses of series-connected light strings, particularly of the so-called "miniature" type, is for decoration and display purposes, particularly during Christmas time and other holidays, and more particularly for the decoration of Christmas trees, inside and outside of commercial, industrial and residential buildings, trees and shrubbery, and the like.

Probably the most popular light set currently available on the market, and in widespread use throughout the world, comprises one or more strings of 50 miniature light bulbs each, with each bulb typically having an operating voltage rating of 2.5 volts, and whose filaments are connected in an electrical series circuit arrangement. If overall strings of more than 50 bulbs are desired, the common practice is to provide a plurality of 50 miniature bulb strings, with the bulbs in each string connected in electrical series, and with the plurality of strings being connected in a parallel circuit arrangement with respect to each other.

As each bulb of each string is connected in series, when a single bulb fails to illuminate for any reason, the whole string fails to light and it is very frustrating and time consuming to locate and replace a defective bulb or bulbs. Usually many bulbs have to be checked before finding the failed bulb. In fact, in many instances, the frustration and time consuming efforts are so great as to cause one to completely discard and replace the string with a new string before they are even placed in use. The problem is even more compounded when multiple bulbs simultaneously fail to illuminate for multiple reasons, such as, for example, one or more faulty light bulbs, one or more unstable socket connections, or one or more light bulbs physically fall from their respective sockets, and the like.

BACKGROUND OF THE INVENTION

There are presently available on the market place various devices and apparatuses for electrically testing an individual light bulb after it has been physically removed from its socket. Apparatus is also available on the market for testing series-connected Christmas tree light bulbs, and the like, by physically placing an alternating current line voltage sensor in close proximity to the particular light bulb desired to be tested. However, such a device is merely an electromagnetic field strength detection device which may remain in an "on" condition whenever the particular bulb desired to be tested is physically located in close proximity to another light bulb or bulbs on the Christmas tree.

In fact, light bulb manufacturers have also attempted to solve the problem of bad bulb detection by designing each light bulb in the string in a manner whereby the filament in each light bulb is shorted by various mechanisms and means whenever it burns out for any reason, thereby preventing an open circuit condition to be present in the socket of the burned-out bulb. However, in actual practice, it has been found that such short circuiting feature within the bulb does not always operate in the manner intended, resulting in the entire string going out whenever but a single bulb burns out.

In U.S. Pat. No. 5,539,317, entitled CIRCUIT TESTER FOR CHRISTMAS TREE LIGHT SETS and filed on Nov. 7, 1994 by the same applicant as the instant application, there is disclosed therein a novel, hand held and battery operated device which is capable of testing each light bulb in a string without the necessity of removing the bulb from its socket, thereby readily locating the burned out bulb which caused the entire string of bulbs to go out.

Even though each of the foregoing techniques have met with some limited success, none of such devices and techniques have yet been able to further solve the additional problems of the entire string of lights going out as a direct result of either a defective socket, a light bulb being improperly placed in the socket, a broken or bent wire of a light bulb, or whenever a light bulb is either intentionally removed from its socket or is merely dislodged from its socket during handling or from movement after being strung on the Christmas tree, particularly in outdoor installations subject to wind or other climatic conditions.

U.S. Pat. No. 4,450,382 utilizes a single Zener or "avalanche" type diode which is electrically connected across each series-connected direct-current ("D.C.") lamp bulb used by military vehicles, strictly for so-called "burn-out" protection for the remaining bulbs whenever one or more bulbs burns out for some reason. It is stated therein that the use of either a single or a plurality of parallel and like-connected Zener diodes will not protect the lamps against normal failure caused by normal current flows, but-will protect against failures due to excessive current surges associated with the failure of associated lamps. No suggestion appears therein of even any recognition whatsoever that the problems confronting Applicant even existed let alone any suggestion of any mechanism or technique whatsoever which would provide a solution to the problems successfully achieved by applicant in a very simple and effective manner.

Various other attempts have heretofore been made to provide various types of shunts in parallel with the filament of each bulb, whereby the string will continue to be illuminated whenever a bulb has burned out, or otherwise provides an open circuit condition. However, to the knowledge of Applicant, none of such arrangements have been practical enough from a commercial standpoint to ever become available on the marketplace.

Typical of such arrangements are found in U.S. patents RE 34,717; 1,024,495; 2,072,337; 2,760,120; 3,639,805; 3,912,966; 4,450,382; 4,682,079; 4,727,449; 5,379,214; and 5,006,724, together with English patent 12,398; Swiss patent 427,021 and French patent 884,370.

Of the foregoing prior art patents, the Fleck 449, Harnden '966, and the Swiss '021 patents appear, at first blush, to probably be the most promising in the prior art in indicating defective bulbs in a string by the use of filament shunt circuits and/or devices of various types which range from polycrystalline materials, to powders, and to metal oxide varistors, and the like, which provide for continued current flow through the string, but at either a higher or a lower level. The reason for this is because of the fact that the voltage drop occurring across each prior art shunt is substantially a different value than the value of the voltage drop across the incandescent bulb during normal operation thereof.

Some of these prior art shunts cause a reduced current flow in the series string because of too high of a voltage drop occurring across the shunt when a bulb becomes inoperable, either due to an open filament, a faulty bulb, a faulty socket, or simply because the bulb is not mounted properly in the socket, or is entirely removed or falls from its respective socket. However, other shunt devices cause the opposite effect due to an undesired increase in current flow. For example, when the voltage dropped across a socket decreases, then a higher voltage is applied to all of the remaining bulbs in the string, which higher voltage results in higher current flow and a decreased life expectancy of the remaining bulbs in the string. Additionally, such higher voltage also results in increased light output from each of the remaining bulbs in the string, which may not be desirable in some instances. However, when the voltage dropped across a socket increases, then a lower voltage is applied to all of the remaining bulbs in the series connected string, which results in lesser current flow and a corresponding decrease in light output from each of the remaining bulbs in the string. Such undesirable effect occurs in most of the prior art attempts, including those which, at first blush, might be considered the most promising techniques, especially the proposed use of a diode in series with a bilateral switch in the Fleck '449 patent, or the proposed use of a metal oxide varistor in the above Harnden '966 patent, or the use of the proposed counter-connected is rectifiers in the Swiss '021 patent.

For example, in the arrangement suggested in the above Fleck '449 patent, ten halogen filled bulbs, each having a minimum 12-volt operating rating, are utilized in a series circuit. The existence of a halogen gas in the envelope, permits higher value current flow through the filament with the result that much brighter light is obtainable in a very small bulb size. Normally, when ten 12-volt halogen bulbs are connected in a series string, the whole string goes dark whenever a single bulb fails and does not indicate which bulb had failed. To remedy this undesirable effect, Fleck provided a bypass circuit across each halogen filled bulb which comprised a silicon bilateral voltage triggered switch in series with a diode which rectifies the alternating-current ("A.C.") supply voltage and thereby permits current to flow through the bilateral switch only half of the time, i.e., only during each half cycle of the A.C. supply voltage. It is stated in Fleck that when a single bulb burns out, the remaining bulbs will have "diminished" light output because the diode will almost halve the effective voltage due to its blocking flow in one direction and conduction flow only in the opposite direction. Such substantially diminished light output will quite obviously call attention to the failed bulb, as well as avoid the application of a greater voltage which would decrease the life of the remaining filaments. However, in actual practice, a drastic drop in brightness has been observed, i.e. a drop from approximately 314 lux illumination output to approximately 15 lux illumination output when one bulb "goes out". Additionally, it is stated by the patentee that the foregoing procedure of replacing a burned out bulb involves the interruption of the application of the voltage source in order to allow the switch to open and to resume normal operation after the bulb has been replaced. (See column 2, lines 19–22 therein.) Additionally, as such an arrangement does not permit more that one bulb to be out at the same time, certain additional desirable special effects such as "twinkling", and the like, obviously would not be possible.

In the arrangement suggested in Harnden '966 patent, Harnden proposes to utilize a polycrystalline metal oxide varistor as the shunting device, notwithstanding the fact that it is well known that metal oxide varistors are not designed to handle continuous current flow therethrough. Consequently, they are merely a so-called "one-shot" device for protective purposes, i.e. a transient voltage suppressor that is intended to absorb high frequency or rapid voltage spikes and thereby preventing such voltage spikes from doing damage to associated circuitry. They are designed for use as spike absorbers and are not designed to function as a voltage regulator or as a steady state current dissipation circuit. While metal oxide varistors may appear in some cases similar to back-to-back Zener diodes, they are not interchangeable and function very differently according to their particular use. In fact, the assignee of the Harnden '966 patent which was formerly General Electric Corporation and now is apparently Harris Semiconductor, Inc., states in their Application Note 9311: "They (i.e., metal oxide varistors) are exceptional at dissipating transient voltage spikes but they cannot dissipate continuous low level power." In fact, they further state that their metal oxide varistors cannot be used as a voltage regulator as their function is to be used as a nonlinear impedance device. The only similarity that one can draw from metal oxide varistors and back-to-back Zener diodes is that they are both bidirectional; after that, the similarity ends. It is further stated in Harnden that varistors preferably have a rating of 125% of that of the bulb rating and that such rating would result in a decreased "stress" across the remaining bulbs in the series string.

Properly interpreted, this so-called decreased stress results in a loss of illumination in the remaining bulbs. For example, in a 50 bulb string operating at 120 volts A.C., each bulb receives an average voltage of 2.4 volts RMS ("root mean square") or 3.39 peak volts. Since the varistor responds to the peak voltage, the varistor rating of 125% would be 4.24 volts, equivalent to 3.0 volts RMS. The difference between 2.4 volts and 3.0 volts for just a single bulb failure is quite significant, particularly when compounded by subsequent failures of other bulbs in, say, a 50 bulb series string which is strung on outdoor shrubbery, and the like, and is subjected to wind and other movements and, accordingly, is totally unsuitable for Applicant's intended purposes.

In the Swiss '021 patent, Dyre discloses a bilateral shunt device having a breakdown voltage rating that, when exceeded, lowers the resistance thereof to 1 ohm, or less. This low value of resistance results in a substantial increase in the voltage being applied to the remaining bulbs even when only a single bulb is inoperative for any of the reasons previously stated. Thus, when multiple bulbs are inoperative, a still greater voltage is applied to the remaining bulbs, thereby again substantially increasing their illumination, and consequently, substantially shortening their life expectancy.

Even though the teachings of the foregoing prior art have been available for many years to those skilled in the art, none of such teachings, either singly or collectively, have found their way to commercial application. In fact, miniature Christmas tree type lights now rely solely upon a specially designed bulb which is supposed to short out when becoming inoperative. Obviously, such a scheme is not always effective, particularly when a bulb is removed from its socket or becomes damaged in handling, etc. The extent of the extreme attempts made by others to absolutely keep the bulbs from falling from their sockets, includes the use of a locking groove formed on the inside circumference of the socket mating with a corresponding raised ridge formed on the base of the bulb base unit. While this particular locking technique apparently is very effective to keep bulbs from falling from their respective sockets, the replacement of defective bulbs by the average user is extremely difficult, if not sometimes impossible, without resorting to mechanical gripping devices which can actually destroy the bulb base unit or socket.

In Applicant's co-pending application Ser. No. 08/896,278 entitled SERIES CONNECTED LIGHT STRING WITH FILAMENT SHUNTING and filed on Jul. 7, 1997, which application is a continuation of application Ser. No. 08/653,979 filed May 28, 1996 which, in turn, is a continuation-in-part ("CIP") of application Ser. No. 08/560,472 filed Nov. 17, 1995 which, in turn, is a CIP of application Ser. No. 08/494,725 filed Jun. 26, 1995, all of which disclosures are incorporated herein, there is disclosed and claimed therein various novel embodiments which very effectively solve the prior art failures in various new and improved ways. For example, there is disclosed therein a series string of incandescent light bulbs, each having a silicon type voltage regulating shunting device connected thereacross which has a predetermined voltage switching value which is greater than the voltage normally applied to said bulbs, and which said shunt becomes fully conductive only when the peak voltage applied thereacross exceeds its said predetermined voltage switching value, which occurs whenever a bulb in the string either becomes inoperable for any reason whatsoever, even by being removed or falling from its respective socket, and which circuit arrangement provides for the continued flow of rated current through all of the remaining bulbs in the string, together with substantially unchanged illumination in light output from any of those remaining operative in the string even though a substantial number of total bulbs in the string are simultaneously inoperative for any combinations of the various reasons heretofore stated. There is disclosed therein various type of shunting devices performing the above desired end result, including back-to-back Zener, or so-called "avalanche" diodes, non-avalanche bilateral silicon switches, and conventional Zener diodes, one-half of which are electrically connected in one current flow direction and the remaining one-half being electrically connected in the opposite current flow direction.

However, the shunting components required by applicant to achieve the new and unexpected functional results are not yet readily available on the marketplace in sufficient quantities and from an insufficient number of quality suppliers to minimize the purchase price thereof to the extent there will likely be universal acceptance of applicant's light strings as a replacement to all existing light strings who utilize no shunting devices whatsoever.

For example, with a pair of back-to-back Zener diodes capable of being purchased in large quantities for as low as even 6¢ each would result in an additional manufacturing cost of at least $3.00 for a typical 50-bulb light string. This translates to a retail price increase of more than 50% over that of a conventional 50-bulb string having no filament shunting which now sells at retail for less than $5.00 each. Thus, to insure universal or even widespread acceptance of applicant's novel light string, particularly from a typical household, it is desirable that the ultimate cost of the shunting device add no more than 2¢ per each socket, which is highly unlikely with present day manufacturing technology applicable to quantity production of back-to-back Zener diodes, and probably would also require a commitment of substantial development costs in order to get the ultimate selling price that low, if in fact such low selling price is even achievable at all from a practical standpoint.

SUMMARY OF THE INVENTION

In accordance with the present invention, there is provided a new and improved series-connected string of incandescent light bulbs, each having connected thereacross a novel filament voltage regulating shunting circuit which not only insures the attainment of all of the advantages of the various prior and novel circuit arrangements disclosed and claimed in Applicant's said co-pending '278 application, but is further capable of maintaining the voltage across an empty or otherwise inoperative socket at substantially the same value as that across each of the remaining sockets in the string, but with much greater accuracy and consistency than before possible, and of equal or greater importance, constitutes a voltage regulating shunting device which is not only capable of insuring the attainment of all of the foregoing desirable features and functions, but yet is capable of being mass produced by using conventional manufacturing techniques, and thus is one that is much more capable of being manufactured at the desired ultimate selling price of no more than 2¢ for each said shunting circuit, and thereby constituting a novel light string which is more readily capable of universal replacement of existing light strings presently on the marketplace which do not utilize any type of filament shunting and thus do not have any of the advantages as those constructed in accordance with Applicant's invention.

It is therefore a principal object of the present invention to provide a simple and inexpensive, and yet highly effective, non-avalanche silicon type filament voltage regulating shunt, or bypass, for each of a plurality of series connected light bulbs, said filament shunt having a predetermined conductive switching value which is only slightly greater than the voltage rating of said bulbs, and which shunt becomes conductive whenever such predetermined alternating voltage is applied thereacross and which provides continued and uninterrupted flow of rated current through each of the remaining bulbs in the string, together with substantially unchanged illumination in light output therefrom even though a substantial number of bulbs are missing from their respective sockets.

It is another object of the present invention to provide a new and improved series-connected light string which has even much greater desirable features than those previously available, and which utilizes a unique filament voltage regulating shunting circuit which is of very simple and economical construction and is relatively inexpensive to manufacture in mass quantities, thereby keeping the overall cost of the final product at a much lower cost that heretofore possible.

DESCRIPTION OF A PREFERRED EMBODIMENT

Figure 1:
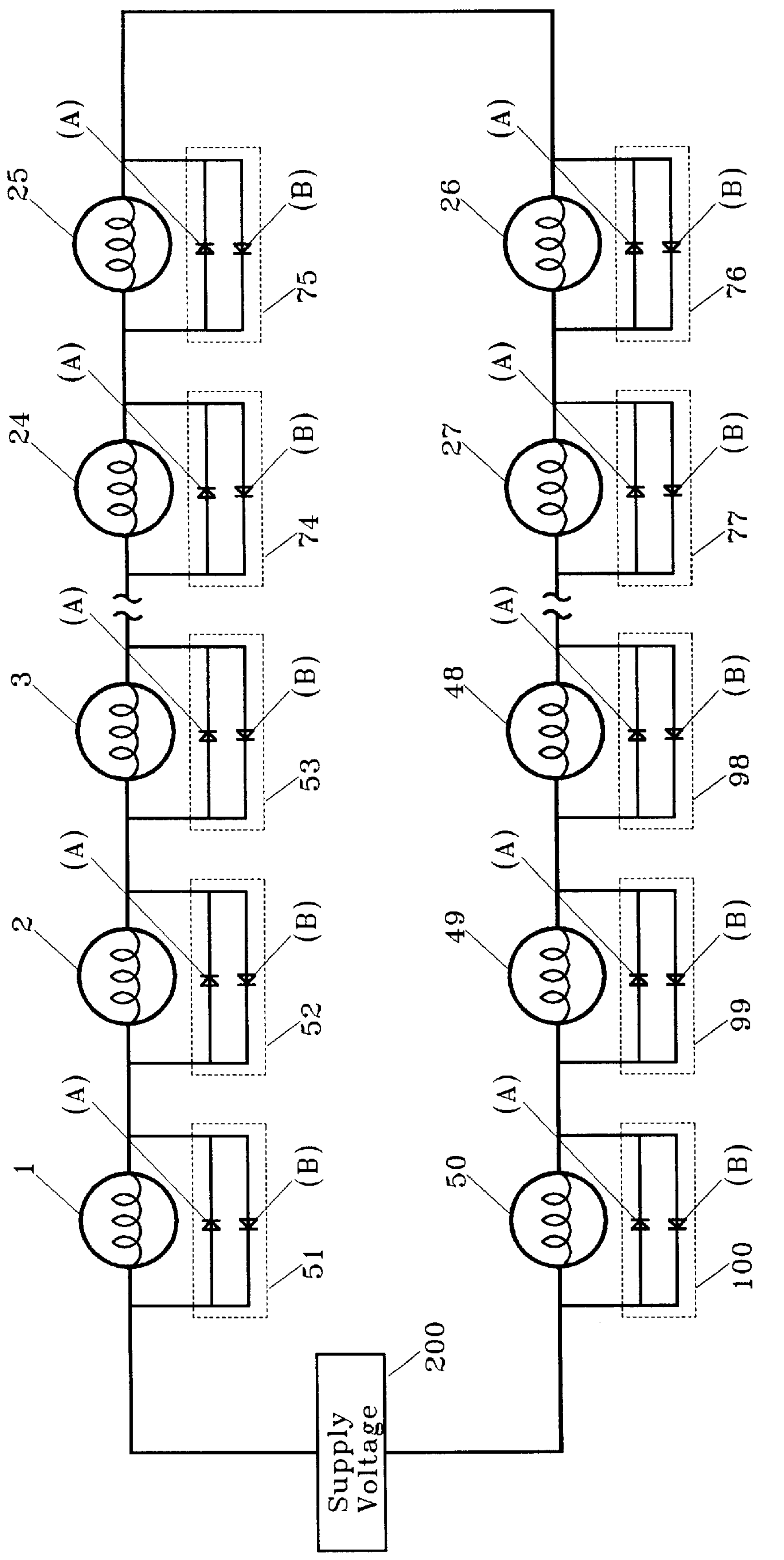
FIG. 1 is an electrical schematic diagram which diagrammatically illustrates the construction of a novel light string in accordance with the teachings of the present invention.

With reference to the schematic diagram in FIG. 1, an illustrative series-circuit light string constructed in accordance with the teachings of the present invention is typically connectable to a source of 110/120 volts of A.C. operating potential 200 which is normally available in typical households, and commercial and industrial establishments. Assuming a typical 50-bulb string, such a series-connected string is provided with a first socket having a first electrical bulb 1 operatively plugged or otherwise positioned therein. The adjacent terminal of the first socket is electrically and series-connected to the adjacent terminal of the second socket having a second electrical bulb 2 operatively plugged therein, and so on, until each of the 50 electrical bulbs in the entire string are finally operatively connected in an electrical series-circuit arrangement between output terminals of power supply 200. For illustrative purposes only, it is assumed that each electrical bulb receives the required operating voltage thereacross of approximately 2.4 volts from A.C. voltage source 200.

Operatively connected in electrical parallel across the electrical terminals of the first socket, hence the electrical terminals of first electric bulb 1, is a first voltage regulating device which is diagrammatically illustrated as 51. Likewise, operatively connected in electrical parallel across the electrical terminals of the second socket, hence second electrical bulb 2, is a second voltage regulating device 52, and so on, until each of the remaining sockets, and hence each of remaining electrical bulbs 3 through 50 of the series has a corresponding one of voltage regulating devices 53 through 100 operatively connected in parallel thereacross.

For practical purposes, it is preferred that all of voltage devices 51 through 100 are of identical construction and ideally comprise the electrical functional equivalent of two identical silicon diodes (A) and (B) which are electrically connected in parallel with each other, but are electrically oriented in opposite directions, i.e. are oppositely "poled", whereby one diode will be electrically conductive only during the first half of the alternating input voltage cycle, whereas, the other diode will be electrically conductive only during the second half of the alternating input voltage cycle. Therefore, with an operative electrical bulb missing in the corresponding socket, the voltage appearing thereacross is preferably slightly higher than the voltage rating of the corresponding electrical bulb, when in the socket. Whereby when that particular bulb is missing from its socket, the voltage across that particular socket remains substantially unchanged and, accordingly, the voltage across each remaining electrical bulbs in the string remain substantially unchanged, hence the light output from each remaining bulb remains substantially unchanged. In other words, the voltage appearing across each voltage regulating device is essentially matched with the voltage rating of its corresponding electrical bulb.

Figure 2:
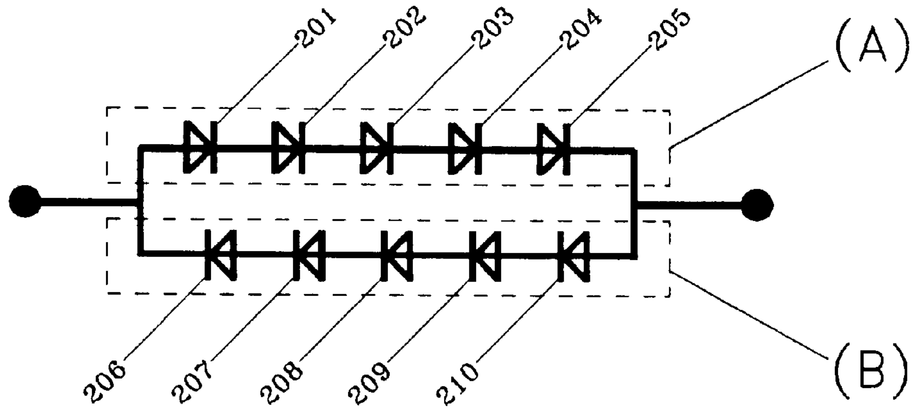
FIG. 2 is an electrical schematic diagram which diagrammatically illustrates the preferred construction of the semiconductive shunts diagrammatically illustrated in FIG. 1; and, FIG. 3 is an electrical schematic diagram of an alternate method of constructing the required non-avalanche shunts shown in FIG. 2.

FIG. 2 diagrammatically illustrates a preferred embodiment which takes advantage of the low cost silicon diodes which are presently available on the marketplace, together with the low cost light bulbs that are presently being used in large quantities of commercially available light strings that have been on the marketplace for a number of years. While FIG. 2 shows two sets of five series-connected silicon diodes, it will become readily apparent hereinafter by any person skilled in the art that the actual number of diodes selected can vary, depending upon the type of diode thereof and the commercial availability thereof, and preferably those of low cost, and the desired end-result to be attained. For example, it is assumed that the five series-connected diodes 201 through 205 comprising voltage regulating device (A) and the five series-connected diodes 206 through 210 comprising voltage regulating device (B) are each the well-known and readily available low-cost 1N4001 type silicon diodes and that each of the electrical bulbs 1-50 are typical 2.4 volt bulbs likewise readily available on the marketplace at low cost. Connecting diodes 201–210 as shown in FIG. 2 resembles dual Zener diodes connected back-to-back as disclosed in Applicant's said '278 co-pending application. It is well known that each of the silicon diodes 201–210 has a forward voltage drop at a specified value of current flowing through it, and ideally will be of the same value from diode to diode, depending upon the quality of the manufacture thereof. In a series-connected light string as used in Christmas and other decorative lighting, a standard so-called "super bright" string will draw approximately 200 milliamperes. In the flow of a 200 milliampere current through a 1 ampere, 50 volt, silicon diode, such as the 1N4001, the forward voltage drop, commonly referred to as the "offset" voltage is approximately 0.8 volts. By using five such silicon diodes connected in series as shown in FIG. 2, a forward voltage drop of approximately 4 volts (peak) is obtained. An electrical bulb operating at 2.4 volts A.C. (RMS) has a peak voltage across it of approximately 3.4 volts. With such a semiconductor device string connected across each electrical bulb socket in a 50-light series wired string, nothing happens until an electrical bulb either burns out, falls out or is deliberately taken out of its respective socket, or otherwise becomes inoperative for any reason. When either of such events occur, the electrically associated silicon semiconductive shunt 51-100 (FIG. 1) continues to maintain the uninterrupted conduction of rated current through the remaining series-connected electrical bulbs in the circuit. More than one electrical bulb can likewise either burn out, fall out or be deliberately taken out of its respective socket, or otherwise become inoperative for any reason and still the remaining electrical bulbs continue to remain illuminated at substantially the same brightness as before. In fact, most or virtually all of the bulbs in the circuit can be removed from their respective sockets before noticeable visual effect is detected in the illumination of the remaining bulbs. In other words, in the example shown in FIG. 2, when an electrical bulb is removed from its respective socket for any reason, the associated semiconductive shunt "takes over" and thereby causes an approximately 0.6 (peak) volts decrease of applied voltage across the entire remaining operative electrical bulbs in the string. This is because when the electrical bulb is operating normally, there is approximately 3.4 (peak) volts dropped across it. Since the shunt (A) and (B) each has an equivalent operating A.C. peak voltage rating of approximately 4.0 volts, when an electrical bulb becomes inoperative for any reason, other than being shorted, there will be an additional 0.6 (peak) volts dropped across its respective socket (i.e. 4.0–3.4=0.6). Therefore, the remainder of the electrical bulbs will receive slightly less voltage. That lesser amount for each electrical bulb will be approximately 0.6 (peak) volts divided by the number of operative electrical bulbs remaining. The actual A.C. voltage (RMS) will therefore only be approximately 0.424 volts less across the operative bulbs remaining. This amounts to a decrease of less than nine-thousandths (0.009) of a volt across each of the remaining electrical bulbs in the string. Therefore, it is quite apparent that such decrease is still much less that that disclosed in Applicant's '278 co-pending application. As a result, the illumination of the remaining electrical bulbs remains substantially unchanged.

As the above example uses the standard miniature 2.4 (RMS) volt electrical bulbs in a standard string of 50 bulbs, it should be quite obvious to anyone skilled in the art that a different voltage rated bulb and a different number of bulbs in the string can be utilized. Other bulbs having different voltage ratings could be used with equal success and which would merely require a different number of bulbs in the string operating at the same 120 (RMS) volts and 60 Hertz input from any supply which is currently available throughout the country. Additionally, it would be quite obvious that this would dictate the number of standard 1N4001 silicon diodes in the series-parallel arrangement.

Not only does the above novel embodiment significantly lower the cost of providing the so-called "StaLit" feature in a series-connected light string operating from an alternating current supply, if one or more, of the standard electrical bulbs are replaced with so-called "flasher" type bulbs, each flasher bulb would flash "on" and "off" independently of each other in exactly the same manner as in Applicant's said '278 co-pending application.

Figure 3:
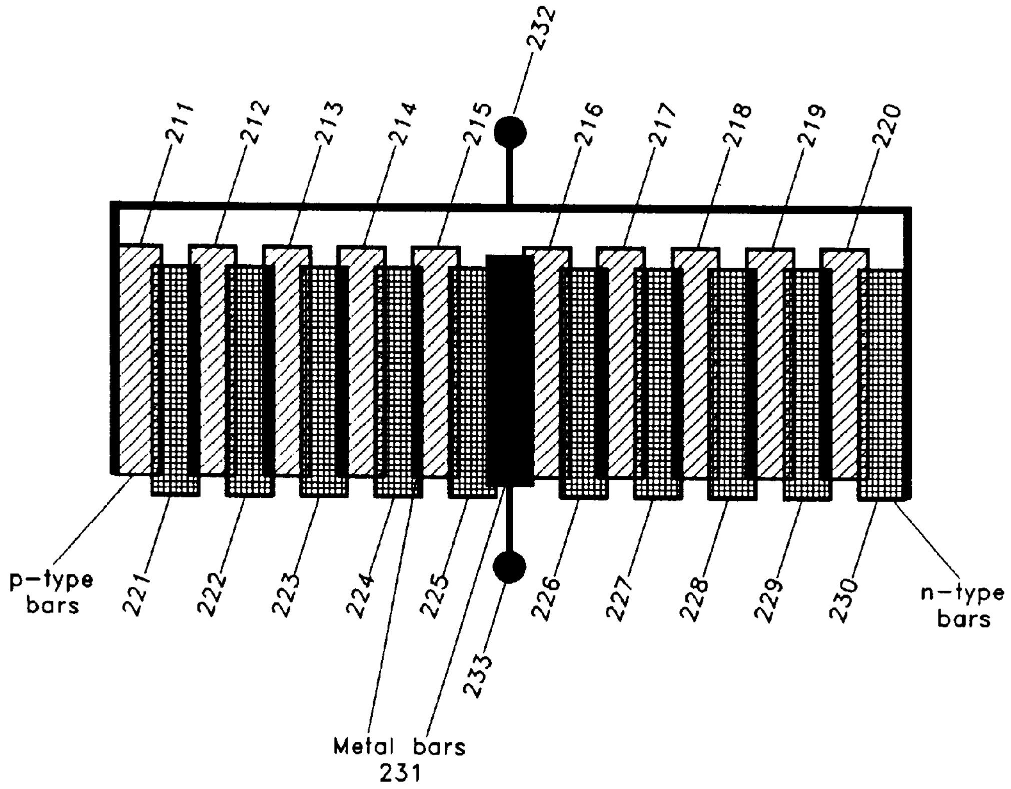

With reference to FIG. 3, there is shown an alternate arrangement of shunts components (A) and (B) shown in FIG. 2. In this arrangement shunt component (A) comprises parallel strips 211 through 215 of standard p-type of semiconductive material which are overlapped by parallel strips 221 through 225 of standard n-type semiconductive material. Whereas shunt component (B) comprises parallel strips 216 through 220 of standard p-type of semiconductive material which are overlapped by parallel strips 226 through 230 of standard n-type semiconductive material. An electrically conductive strip 231 connects shunt components (A) and (B) together to form the desired overall shunt component by overlapping strips 216 and 225 and terminating in terminals 232 and 233.

The shunt shown in FIG. 3 may be constructed by a variety of well-known processes, including silk screening or other well-known printing means. For example, commercially available silicon powder may be suitably doped with either boron or phosphor, thereafter mixed with a suitable well-known binder to make a paste capable of being laid down by well-known silk screening processes or by using a dot matrix printer, all being well known in the art. If boron is used in the mixture and the mixture is thereafter fired or sintered at a high temperature to cause diffusion of the boron into the silicon, a sintered strip of silicon is created having a so-called "p-type" electrical characteristic. Likewise, if the silicon powder is suitably doped with phosphorus in the same manner and the doped mixture is thereafter fired at a similar temperature to cause diffusion of the phosphorus into the silicon, a sintered silicon strip is created having a well-known "n-type" electrical characteristic. The temperature required for firing the strips is normally between 800–1000 degrees Centigrade and the firing time is normally between 20–40 minutes and the firing atmosphere is normally an inert gas such as argon.

To form the overall shunt, a first mixture of the suitably doped mixture is silk screened in the bar pattern shown in FIG. 3 on a substrate of quartz, aluminum oxide, or the like, and thereafter fired in the manner described above. Upon removal from the oven or furnace, the remaining mixture is likewise silk screened on the same substrate and in the same bar pattern and thereafter likewise fired in the manner described above. It is preferred that the spacing between the strips is less than the width thereof, such that one set of strips overlap the other set of strips. In so doing, the overlapping of the strips provides the required series-connected p-type and n-type silicon strips whereby the assembly comprises a plurality of electrically series-connected non-avalanche silicon diodes, with the number thereof obviously being dependent on the number desired for that particular shunt. Leads are connected to the assembly in any one of the well-known means. For example, electrically conductive strip 231 may be of aluminum material which is deposited and alloyed in the silicon in virtually the same manner as above described. Such alloying is normally done at a temperature as low as 400 degrees Centigrade for approximately 20–30 minutes in a hydrogen or forming gas atmosphere. Thereafter, terminals 232 and 233 are connected in any of the many well-known ways.

The end result is that a single boron doped p-type silicon strip becomes the anode and a single phosphorus doped n-type silicon strip becomes the cathode of each of the silicon diodes, and the number of doped pairs determine the number of series connected diodes in each (A) and (B) component of the shunt.

While Applicant has illustrated boron and phosphorus being used as doping agents, it is likewise well-known in the art that other doping agents can be used and that a dot matrix printer is capable of printing strip 231 by using an electrically conductive ink.

It is now only necessary to connect the strips in the manner shown to be suitable for a string of diodes to be used as shunts or voltage regulators in a series-connected string of electrical bulbs as used in present Christmas and other ornamental light strings, and the like, including statuaries. Such a process of fabricating non-avalanche diodes presents a very low cost of method of fabrication over the use of crystalline silicon. For an example of prior art doping techniques, see "Reference Data For Engineers: Radio, Electronics, Computer, and Communication" seventh edition by Howard W. Sams and Company, 1989.

What is claimed is:

1. A string set of incandescent bulbs having illuminating filaments connected in an electrical series-circuit arrangement and adapted to be connected to a given source of alternating current operating potential to energize said filaments, the improvement wherein each of the bulb filaments in said string set is electrically connected in parallel across a respective shunt comprising at least one semiconductor diode electrically connected in parallel with at least one oppositely poled semiconductor diode to provide a filament and shunt couple, and wherein each shunt is designed so that the voltage drop across each filament and shunt couple, when said string set is connected to said source of operating potential, is slightly higher when the filament of the couple is inoperative and not illuminating than when that filament is operative and illuminating.

2. A string set of incandescent bulbs as set forth in claim 1, wherein said diodes are doped silicon diodes.

3. A string set of incandescent bulbs as set forth in claim 1, wherein said diodes have substantially identical electrical characteristics.

4. A string set of incandescent bulbs as set forth in claim 1, wherein each of said shunts comprises a first set of a plurality of semiconductor diodes electrically connected in parallel with a second set of a plurality of oppositely poled semiconductor diodes.

5. A string set of incandescent bulbs as set forth in claim 4, wherein the diodes of each set of said plurality of diodes are electrically connected in series with each other.

6. A string set of incandescent bulbs as set forth in claim 5, wherein the electrical characteristics of both sets of series connected diodes are substantially the same.

7. A string set of incandescent bulbs as set forth in claim 4, wherein each of said incandescent bulbs has an alternating current voltage rating of approximately 2.4 (RMS) volts, and each of said sets of semiconductor diodes comprises five 1N4001 silicon diodes connected in electrical series with each other.

8. A string set of incandescent bulbs as set forth in claim 1, wherein said semiconductor diodes are formed by printing the diodes on a substrate.

* * * * *

US006084357C1

(12) EX PARTE REEXAMINATION CERTIFICATE (5492nd)

United States Patent

Janning

(10) Number: US 6,084,357 C1

(45) Certificate Issued: Sep. 5, 2006

(54) SERIES CONNECTED LIGHT STRING WITH FILAMENT SHUNTING

(75) Inventor: John L. Janning, Dayton, OH (US)

(73) Assignee: JLJ, Inc., Dayton, OH (US)

Reexamination Request:
No. 90/006,819, Oct. 22, 2003

Reexamination Certificate for:
Patent No.: 6,084,357
Issued: Jul. 4, 2000
Appl. No.: 09/058,451
Filed: Apr. 10, 1998

(51) Int. Cl.
*H02H 9/00* (2006.01)

(52) U.S. Cl. ............... 315/122; 315/185 R; 315/185 S; 361/54

(58) Field of Classification Search ............. 315/185 S, 315/185 R, 92, 122, 129, 130, 132, 323, 315/200 A, 312, 186–193; 361/54, 58
See application file for complete search history.

(56) References Cited

U.S. PATENT DOCUMENTS 4,450,382 A * 5/1984 Sawka et al. ................. 315/82
4,727,449 A * 2/1988 Fleck .......................... 361/54
5,886,423 A * 3/1999 Gershen et al. ............... 307/36

OTHER PUBLICATIONS

McGraw–Hill Dictionary of Scientific and Technical Terms, 6th edition, earliest copyright date back in 1974, pp. 1672, 1932.*

* cited by examiner

*Primary Examiner*—Wilson Lee

(57) ABSTRACT

A string set of series-connected incandescent bulbs adapted to being connected to a source of alternating-current operating potential and in which all of the bulb filaments in the set are individually provided with a non-avalanche shunt circuit which substantially maintains the rated voltage of the bulb across each of the bulb sockets whether or not an operative bulb occupies its respective socket and whereby the illumination of each remaining operative bulb continues to be substantially unchanged and substantially the same rated current continues to flow through said string set despite the absence of a plurality of bulbs from their respective sockets.

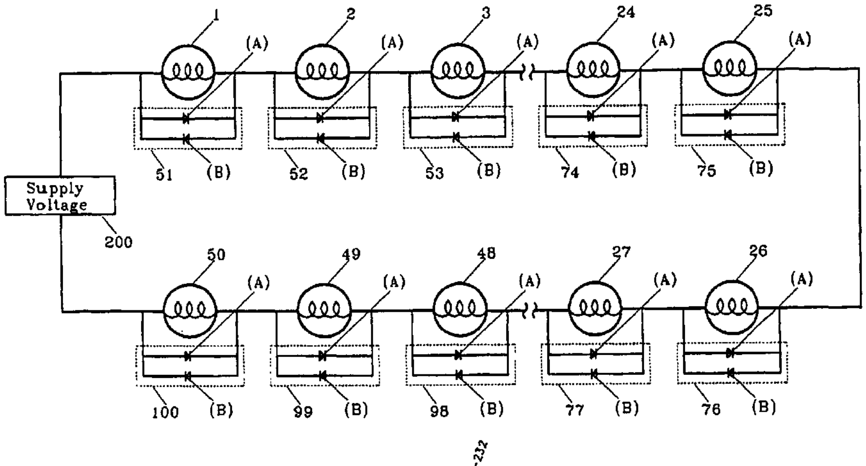

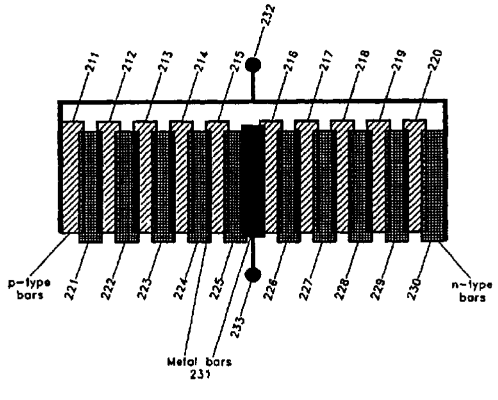

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *